United States Patent [19]

Seachman

[11] 4,348,593

[45] Sep. 7, 1982

[54] TWISTING GEOMETRY OPTICAL SYSTEM UTILIZING IMAGING ARRAY WITH TIME DELAY SEGMENTS

[75] Inventor: Ned J. Seachman, Penfield, N.Y.

[73] Assignee: Xerox Corporation, Stamford, Conn.

[21] Appl. No.: 229,375

[22] Filed: Jan. 29, 1981

[51] Int. Cl.$^3$ .............................................. H04N 1/10
[52] U.S. Cl. ..................................... 250/578; 358/293
[58] Field of Search ................ 250/578; 358/293, 213, 358/294

[56] References Cited

U.S. PATENT DOCUMENTS

| | | | |
|---|---|---|---|
| 2,627,199 | 2/1953 | O'Brien | 88/1 |
| 3,814,846 | 6/1974 | Snow | 178/7.1 |
| 3,947,816 | 3/1976 | Rabedeau | 340/146.3 |
| 3,962,681 | 6/1976 | Requa et al. | 340/146.3 |
| 4,044,384 | 8/1977 | Inokuchi | 358/293 |
| 4,080,633 | 3/1978 | Starkweather | 358/293 |
| 4,114,037 | 9/1978 | Westwood | 250/216 |
| 4,149,090 | 4/1979 | Agulnek | 250/566 |
| 4,149,091 | 4/1979 | Crean et al. | 250/566 |

OTHER PUBLICATIONS

Solid State Imaging Sensors (text), edited by Paul G. Jespers et al.; see chapter entitled "Time Delay and Integration Image Sensors," pp. 659–665, by D. F. Barbe.

*Primary Examiner*—David C. Nelms
*Assistant Examiner*—Darwin R. Hostetter

[57] ABSTRACT

The invention relates to an optical scanning system which utilizes a tilted lens array to image scan line segments onto an area array of detector units. Each line segment is imaged onto a multiple time integration segment which enhances effective exposure by integration of multiple scans for each line segment.

6 Claims, 4 Drawing Figures

FIG. I

TWISTING GEOMETRY OPTICAL SYSTEM UTILIZING IMAGING ARRAY WITH TIME DELAY SEGMENTS

This invention relates to an optical scanning system and more particularly, to a system utilizing a lens array tilted at an angle with respect to an object line which projects an image of the object line onto a tiered array of linear image sensors.

Large arrays of solid-state photosensors are currently used in applications such as video cameras and document scanners. The semiconductor fabrication techniques currently employed to manufacture these arrays limit the maximum physical dimension to approximately one inch. There are further limitations, both physical and electrical, which establish a minimum center-to-center distance between adjacent photosensor elements. Thus, in a single linear array, there exists a maximum number of photosensor elements which can be practically fabricated. Since the image resolution achievable with such an array is proportional to the number of photosensor elements in the array, there are potential scanning applications where the available number of photosensors in one array is insufficient to produce the desired image resolution. To overcome this problem, it has been proposed that several short, linear solid state photosensors arrays be aligned along a single axis to provide the effect of one array long enough to provide for all of the bit storage needed. Implementation of long linear solid state photosensor arrays from a plurality of shorter linear photosensor arrays requires that a crossover from one array to the next occur at some position along the scan line. Aligning the arrays, for example, so that the last detector of the previous array and the first detector of the next array lies on common centers, requires sensitive opto-mechanical tolerances which could be costly, difficult to maintain in a machine environment, and inconvenient to implement on a production basis.

An improved optical scanning system which addresses this problem is disclosed in U.S. Pat. No. 4,080,633 assigned to the same assignee as the present invention. This reference discloses a flying spot scanning system which utilizes a lens array tilted at an angle to a document scan line to convey the bit position information content of the document scan line onto a tiered array of light sensitive detectors disposed along an axis perpendicular to the axial direction of the scan line. The lens array has a lens of proper focal length associated with each scan segment of the document scan line and the detector array has a detector unit associated with each scan segment of the document scan line, with each detector unit having a detector element corresponding to each bit position of the scan segment associated with that detector unit, such that the information content of each scan segment is recorded on a different one of the tiered detector units of the detector array via a different lens of the lens array. Due to a twisting or axial reorientation of the information content of the scan line produced by the tilted lens array, a tiered or two dimensional (area) array of detector units can be utilized to record the information content of the scan line. Unlike long linear detector arrays, area detector arrays with greater than 10,000 photosensing elements can be manufactured by conventional manufacturing techniques since they only require a rectangular-shaped semiconductor material wafer on the order of one inch by one quarter inch.

The type of geometry disclosed in the above referenced patent has several characteristics which may not be appropriate for certain applications. The focusing requirements dictate the use of small lenses with short center-to-center spacings. The lens f numbers are relatively high and, to maintain adequate photosensor irradiance scanning speeds must be at relatively slower rates.

In copending application U.S. Ser. No. 179,204, filed on Aug. 18, 1980 and assigned to the same assignee as the present invention, one solution to the problem of high f numbers is provided by staggering the lens array and imaging alternate segments of the object line. This permits larger diameter lens to be used with a relatively simple area photosensor array. The system permits radiometric gains to be achieved using larger and more complex lenses.

The present invention provides an improved optical scanning system utilizing a tilted lens array to image scan line segments onto an area array of detector units. This is achieved with a single row of small lenses as described in U.S. Pat. No. 4,080,633. In the present system, however, the lenses are spaced to permit time delay and integration (TDI) photosensor arrays to be used so as to provide significant improvements in signal-to-noise ratios. While TDI single array techniques are known in the art, e.g. pages 659–665 of the text "Solid State Imaging," edited by P. Jespers et al (1976), the combined use of several arrays used in conjunction with multiple lens arrays in the scanning system of the present invention is believed to be an unobvious combination.

Figure 1:
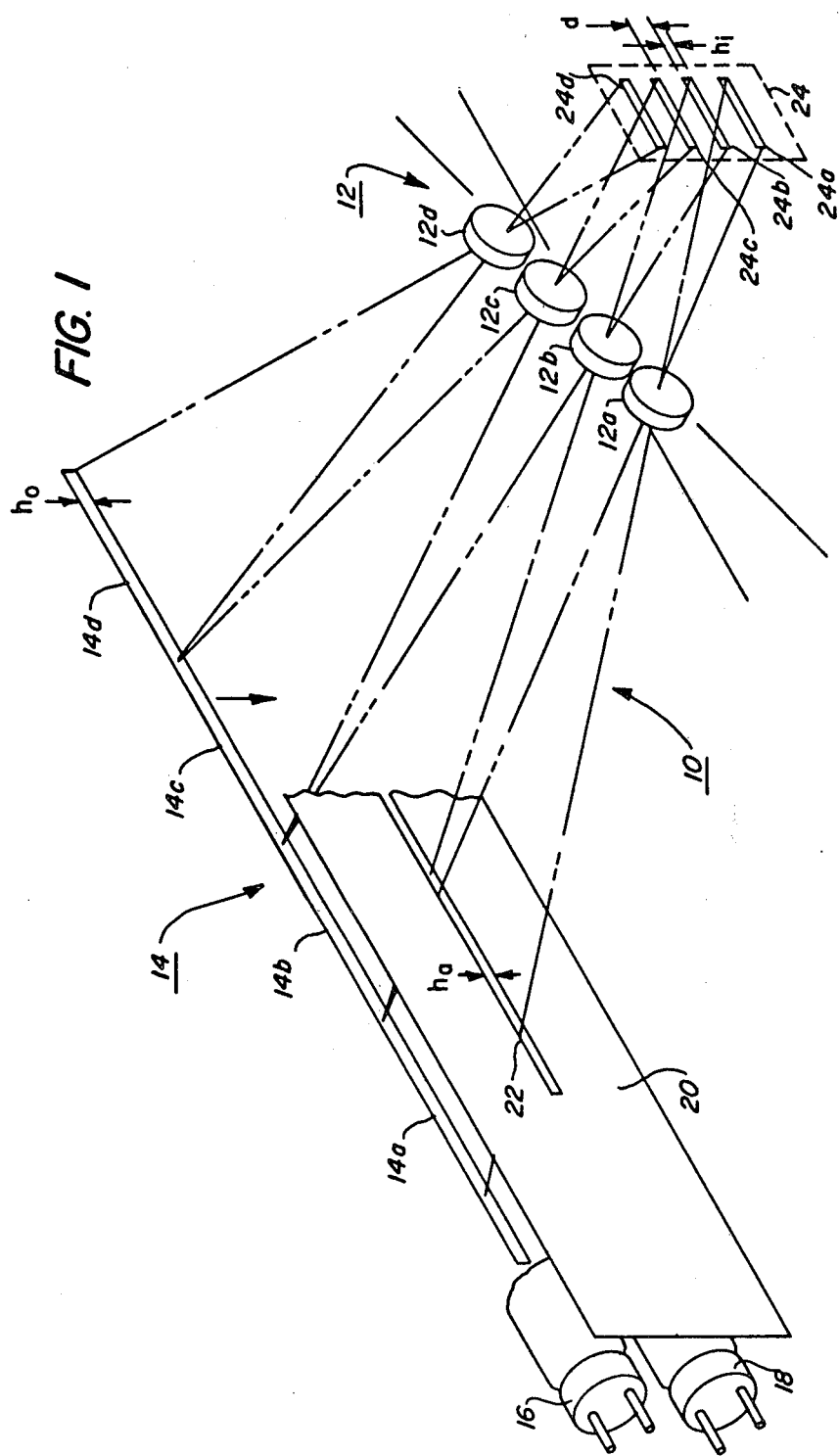
FIG. 1 is a schematic view of a line scan system utilizing a twisted lens array and TDI photosensor array.

Referring now to FIG. 1, there is shown an optical system generally designated as 10 which utilizes a twisted lens array 12 of the type disclosed in U.S. Pat. No. 4,080,633. In the system disclosed in the reference, a laser light source scanned object line 14 with a coherent light spot. This scan method permitted the vertical (cross-scan) dimension of line 14 to be selected such that images of precisely defined height were free of crosstalk between segments projected onto the area array. In FIG. 1, the illumination system consists of a pair of fluorescent lamps 16, 18 interposed between object line 14 and a field stop 20. As line 14 (which may be an information bearing line on a document) is moved in the direction indicated, light is reflected from line 14 passing between the lamps and through aperture 22 of stop 20. The information content of line segments 14a–14d is projected by lenses 12a–12d respectively onto area array 24, whose construction is more fully described below.

The use of lamps 16, 18 and stop 20 permits realization of a less expensive illumination system than that used in the prior art, but still leaves two problems which must be resolved. The first lies in the fact that, as with other optical systems with a relatively large field of view which utilize a field stop, a vignetted image of each object is produced at the image array surrounding the useful unvignetted image. Adjacent image segments must, therefore be sufficiently separated to prevent the sensing of the vignetted image of their neighbors. The second problem is to effectively increase radiometric efficiency so that relatively fast scanning speeds can be attained (i.e. a rapid rate of travel of line 14).

According to the principles of the invention, image segments 24a-d each comprise a plurality of multiple time delay integration (TDI) detector segments. The exposure of each group of TDI detectors is summed, thus multiplying the exposure of a conventional single lens system by the number of chosen detector lines within each segment. The grouped detectors, each associated with a specific segment of line 14, are separated from each other by a space upon which the partially vignetted image from adjacent images segments is allowed to fall.

Before considering a specific embodiment for the TDI detector configuration, the relationships which must exist between object and image height is necessary.

Figure 2:
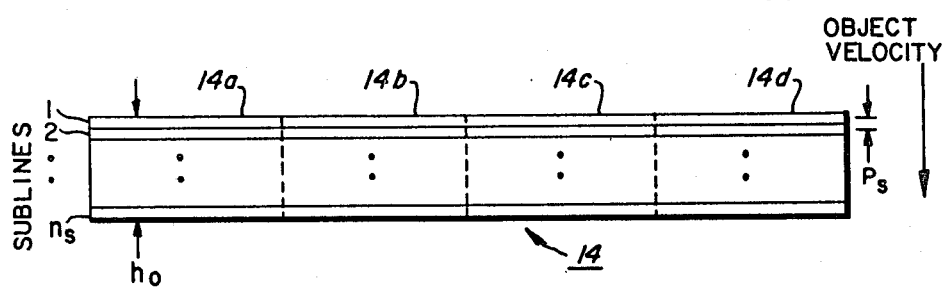
FIG. 2 is an enlarged view of a scanned object line.
Figure 3:
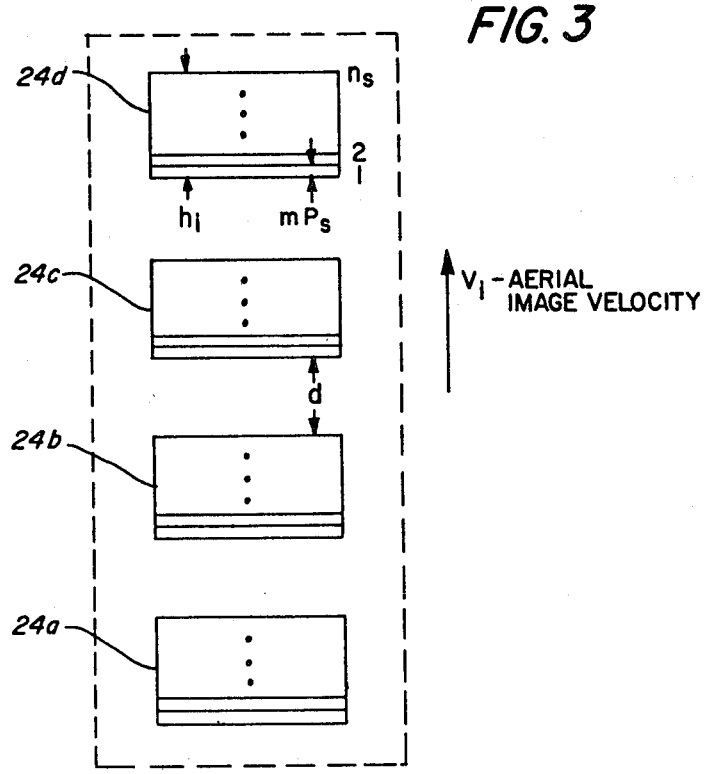
FIG. 3 is an enlarged view of the TDI photosensor array of the present invention.

Referring to FIGS. 1-3, line 14, one of a plurality of adjacent lines to be scanned, has an object height $h_o$. Line 14, divided into segments 14a-14d, as shown in FIG. 2, can be considered to comprise a plurality of sublines 1, 2, ... $n_s$, the center of each subline separated from the center of the adjacent subline by a scan pitch $p_s$ dimension. The height $h_i$ of each image segment (FIG. 3) is the product of $h_o$ and of the magnification, m, of each associated lens. The field stop aperture height $h_a$ must be chosen such that a sufficiently large, unvignetted image height $h_i$ is achieved. According to one of the principles of the present invention, image height $h_i$ should be the product of $n_s$, scan pitch $p_s$ is the cross-scan direction and lens magnification m. In other words, $h_i = n_s p_s m$. Thus, as shown, each detector segment 24a-24d consists of $n_s$ lines of detectors, each separated by image scan pitch distance $mp_s$. This configuration will now result in the $n_s$ sublines of scan line 14 being imaged onto the $n_s$ detector lines. The coordinates of lenses 12a-12d are chosen to allow a "dead" space d in the image plane between image segments. This "dead" space contains the partially vignetted images from both adjacent image segments, and, because of the cross-talk, is unusable.

The information content of the $n_s$ sublines of each detector segment is electronically caused to scan in a vertical direction in synchronism with the aerial image velocity, $v_i$. In this manner, each of the sublines is reexposed $n_s$ times from beginning to end of the segment. The result of this time delay integration (TDI) is to increase the signal by $n_s$ times because of the coherent addition of the signal information while increasing noise by approximately $\sqrt{n_s}$ times because its random nature causes incoherent addition. An improvement occurs in signal-to-noise ratio of approximately $$n_s/\sqrt{n_s} = \sqrt{n_s},$$

as described for example in the previously cited reference.

Figure 4:
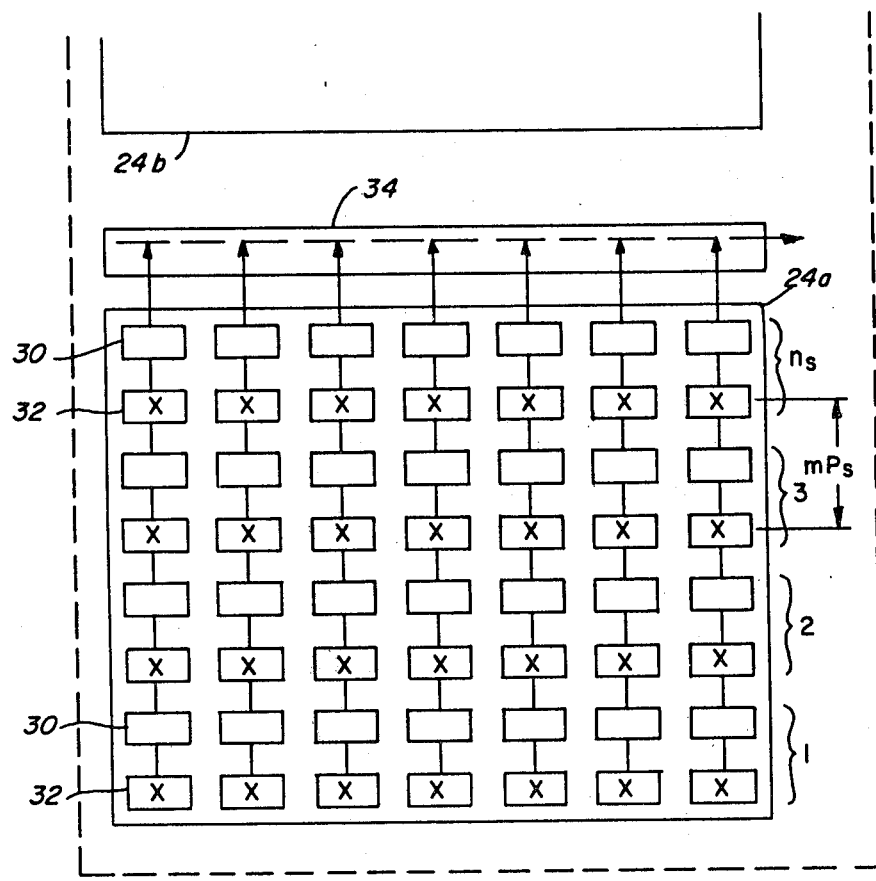
FIG. 4 is an enlarged view of a single image segment of the TDI array.

The detector segments 24a-24d must be capable of simultaneously detecting and translating the electronic images in synchronism with the moving aerial image. Detector configurations capable of this simultaneous detection and translation are known in the art and an exemplary detector using 2-phase technology is shown in FIG. 4. Image segment 24a of array 24 contains $n_s$ sublines. Each subline contains a multiplicity of elemental two phase stages, each stage consisting of two linear CCD gates 30,32. These gates are transparent and form the optical detectors. During relative scan motion, the signal produced by the detectors is translated vertically along columns, each column emptying into shift register 34, which registers one pixel from each column. All the pixels in the register are shifted out through an output stage (not shown) before the next pixels from the columns are loaded into the register.

The serial outputs are combined in numerical order by conventional timing circuits (not shown) which may be on the same chip or external to it. The gate segments marked with an "X" are the effective detector centers during the instant their clock phase is high. The vertical scan pitch $mP_s$ is measured between these points.

Additional array segments 24b-24d, identical in construction to 24a are spaced above 24a and separated from each other by "dead" space d. All segments are preferably formed on one chip.

EXAMPLE

System parameters for a 10 lens 356 mm object scan length with 14 pixels/mm sampling are set forth in Table 1. The field stop is located 50 mm from the document, allowing adequate space for the platen and fluorescent lamps. The key parameters for each segment are tabulated, including the center coordinates for each object segment, the x, y coordinates of each lens center, the x, y coordinates of each image segment center, the vertical extent ($Y_{max}$, $Y_{min}$) of each image segment (from which $h_i = Y_{max} - Y_{min} = 0.614$ mm and $d = Y_{min}$-[I] $- Y_{max}$[I$-$I] $=0.636$ mm), the vertical extent of the vignetted image about each segment (demonstrating the absence of crosstalk), the imaging semifield of each lens, and the maximum semifield of each lens.

The ten lenses were f/24, 132.04 mm focal length. Because of the high f/# these lenses can be simple (singlets) and should have good depth of focus. The segment height, $h_i$, is adequate for about 23 TDI stages in each column. Thus, the S/N ratio should be at least as good as a single line scanner (no TDI) operating at $24/23 = f/5.0$.

The entire 10 segments of the TDI photosensor occupy a total dimension of 12.5 × 12.5 mm, including dead spaces. The TDI columns are spaced on 25 micrometer (mm) centers and the individual gates within the column on 12.5 micron spaces. Since, at any instant one of the two gate phases is high and the neighbor gates are temporary charge barriers, the image sampling centers are on 25 micron centers vertically and horizontally. Photons absorbed under the barrier gates generate electrons which generally diffuse to one of the neighboring "high" gates in the same column. Thus, the photosensitive region about each pixel occupies a very large percentage of the 25 × 25 micron square allotted to each pixel. The sensing area is therefore, very efficiently utilized.

The above system is seen to effectively eliminate the signal-to-noise ratio problems due to high lens f/#, while maintaining the simplicity of the originally conceived lens array. The resulting silicon detector chip has a reasonable size and level of complexity, and can be very efficiently utilized in the imaging area. It is also demonstrated that a field stop exists which simultaneously permits conventional illumination systems (e.g.

T-8 or T-1L fluorescent lamps) and a reasonably small vignetting region about each image segment.

TABLE I

| Seg No | Object X-Coord | Lens X-Coord | Lens Y-Coord | Image X-Coord | Image Y-Coord | Image Y-Max | Image Y-Min | Vignetting Y-Max | Limits Y-Min | Semi-Field | Max-Field |
|---|---|---|---|---|---|---|---|---|---|---|---|
| 1 | −160.200 | −41.533 | −4.167 | .000 | −5.625 | −5.318 | −5.932 | −4.964 | −6.603 | 1.92 | 15.01 |
| 2 | −124.600 | −32.304 | −3.241 | .000 | −4.375 | −4.068 | −4.682 | −3.679 | −5.318 | 1.95 | 12.20 |
| 3 | −89.000 | −23.074 | −2.315 | .000 | −3.125 | −2.818 | −3.432 | −2.394 | −4.033 | 1.98 | 9.34 |
| 4 | −53.400 | −13.844 | −1.389 | .000 | −1.875 | −1.568 | −2.182 | −1.109 | −2.747 | 1.99 | 6.43 |
| 5 | −17.800 | −4.615 | −.463 | .000 | −.625 | .318 | −.932 | .177 | −1.462 | 2.00 | 3.48 |
| 6 | 17.800 | 4.615 | .463 | .000 | .625 | .932 | .318 | 1.462 | −.177 | 2.00 | 3.48 |
| 7 | 53.400 | 13.844 | 1.389 | .000 | 1.875 | 2.182 | 1.568 | 2.747 | 1.109 | 1.99 | 6.43 |
| 8 | 89.000 | 23.074 | 2.315 | .000 | 3.125 | 3.432 | 2.818 | 4.033 | 2.394 | 1.96 | 9.34 |
| 9 | 124.600 | 32.304 | 3.241 | .000 | 4.375 | 4.682 | 4.068 | 5.318 | 3.679 | 1.93 | 12.20 |
| 10 | 160.200 | 41.533 | 4.167 | .000 | 5.625 | 5.932 | 5.318 | 6.603 | 4.964 | 1.88 | 15.01 |

| SYSTEM PARAMETERS: | |
|---|---|
| NO. OF LENSES | 10 |
| MAGNIFICATION | .35 |
| FOCAL LENGTH | 132.04 |
| OBJECT LENGTH | 356.00 |
| ARRAY LENGTH | 12.46 |
| ARRAY HEIGHT | 12.50 |
| DOCUMENT SAMPLES/LENGTH | 14.0 |
| ARRAY SAMPLES/LENGTH | 40.00 |
| FIELD STOP | 50.00 FROM OBJECT PLANE |
| FIELD STOP HEIGHT LIMITS | 1.66, −1.66 |
| OBJECT DISTANCE | 509.30 |
| IMAGE DISTANCE | 178.26 |
| OVERALL CONJUGATE | 687.56 |
| MINIMUM LENS SEPARATION | 9.28 |
| MINIMUM F/# | 17.8 (INF) OR 24.0 (EFF) |
| MAXIMUM OBJECT HEIGHT | .8776 |
| MAXIMUM NUMBER OF TDI STAGES | 23 |

NOTE:
LINEAR DIMENSIONS IN MILLIMETERS

I claim:

1. An optical apparatus for line-by-line scanning of an original document comprising:
   means for illuminating an information-bearing scan line on said document, said line extending in a predetermined axial direction;
   an area detector array including a plurality of detector units oriented along an axis perpendicular to said axial direction;
   said detector units comprising a plurality of multiple time delay integrator detectors; and
   means for projecting an image of said illuminated scan line onto said detector array, said means including an array of lenses oriented along an axis tilted with respect to the axial direction of said scan line in a manner whereby the information content of a plurality of segments of said scan line is each projected upon a predetermined detector unit.

2. The optical apparatus of claim 1 wherein said projecting means further includes a field stop interposed between said illumination means and said lenses, said field stop having an aperture therein which is in optical alignment with said scan line and said lenses.

3. The optical apparatus of claim 1 further including means for moving said document to sequentially move a plurality of information-bearing lines into a scan position.

4. The optical apparatus of claims 1 or 2 wherein said detector units are separated by a distance d which is sufficient to accommodate partially vignetted images from adjacent image segments.

5. The optical apparatus of claim 2 wherein said aperture has a height $h_a$ which will allow projection of an unvignetted image of said scan line of sufficient height with respect to the height of each detector unit.

6. The optical apparatus of claims 1 or 2 wherein each line segment contains a plurality of sublines 1, 2, 3 ... $n_s$, each separated from the other by a scan pitch dimension $p_s$, and wherein the height $h_i$ of the image projected onto each detector unit is a product of $n_s$, $p_s$ and lens magnification m.

* * * * *